No. 717,493. Patented Dec. 30, 1902.
A. ZEIGER.
WORT COOLER.
(Application filed June 7, 1902.)
(No Model.) 2 Sheets—Sheet 1.
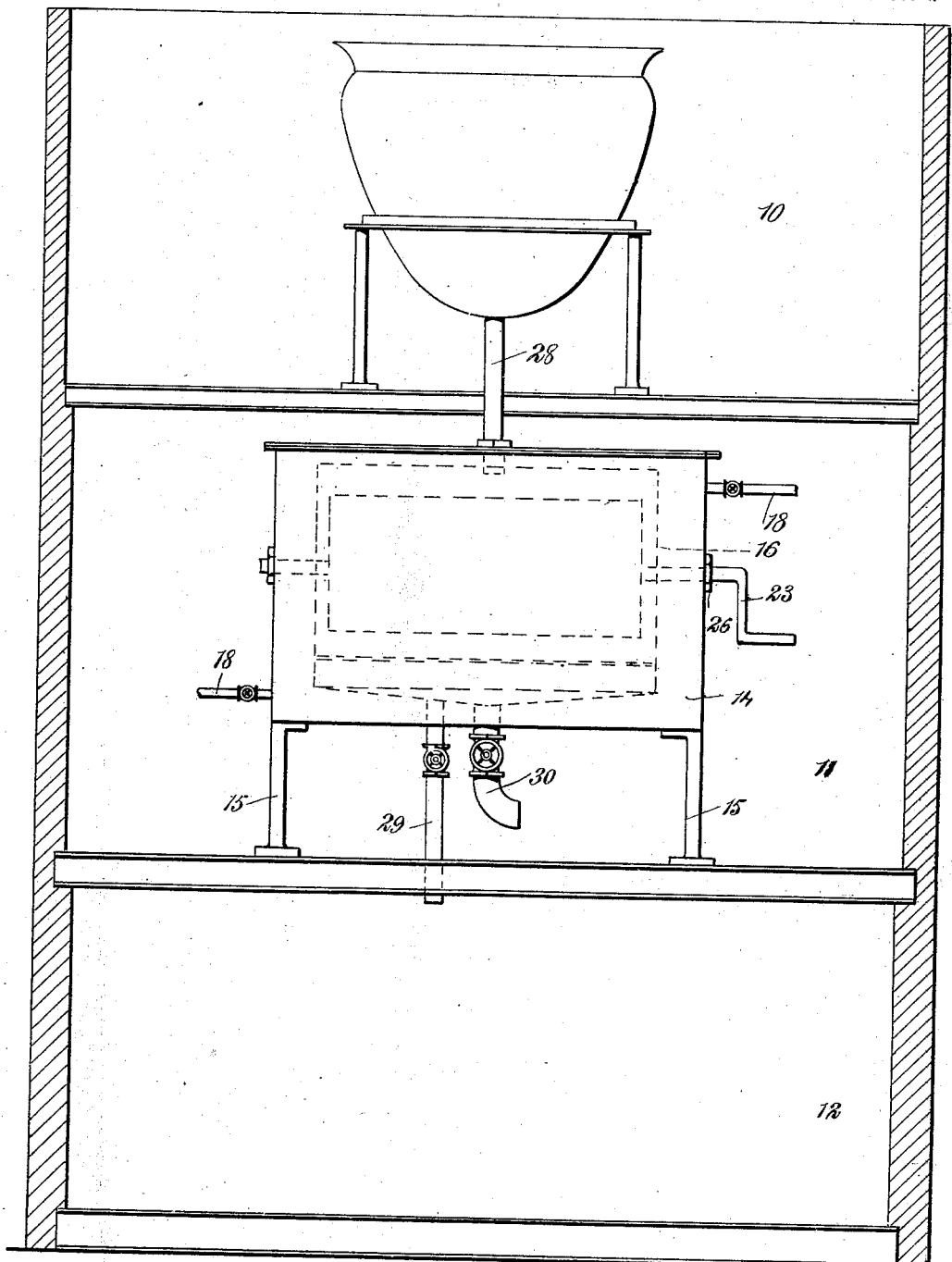
WITNESSES: Fig. 1 INVENTOR
Albert Zeiger
BY
ATTORNEYS.

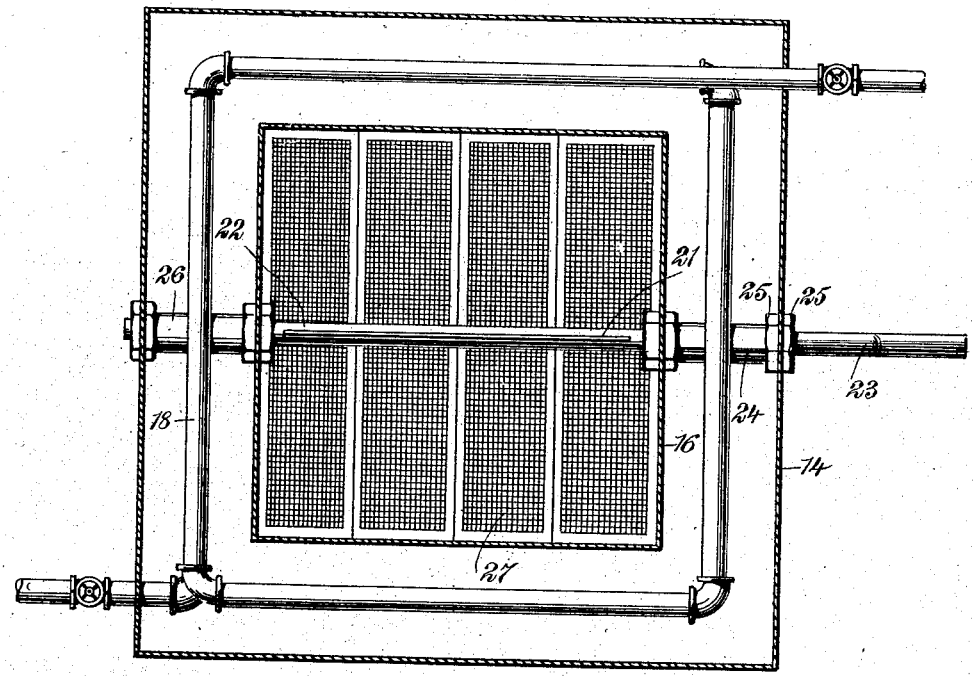
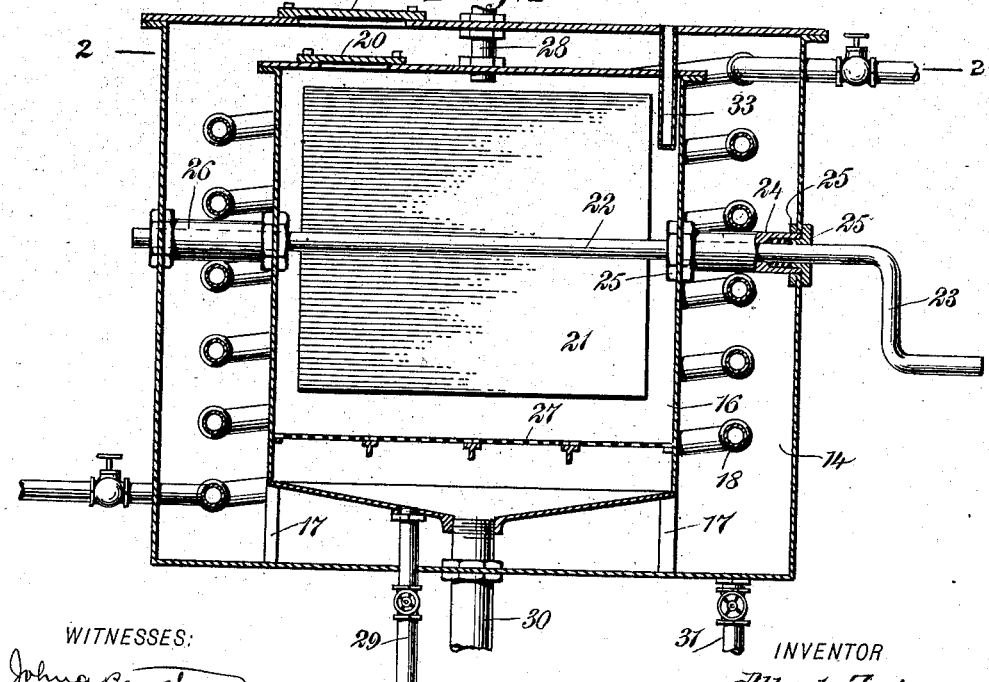

UNITED STATES PATENT OFFICE.

ALBERT ZEIGER, OF BROOKLYN, NEW YORK.

WORT-COOLER.

SPECIFICATION forming part of Letters Patent No. 717,493, dated December 30, 1902.

Application filed June 7, 1902. Serial No. 110,634. (No model.)

*To all whom it may concern:*

Be it known that I, ALBERT ZEIGER, a citizen of the United States, and a resident of the city of New York, borough of Brooklyn, in the county of Kings and State of New York, have invented a new and Improved Wort Cooler and Strainer, of which the following is a full, clear, and exact description.

This invention relates to an apparatus for cooling wort as it comes from the kettles in the brewery; and it embodies certain novel features of construction and arrangement of parts which enables it to be used not only as a wort-cooler, but as a strainer to remove the hops from the wort, thus permitting the wort to be run directly from the cooler into the fermenting-room and dispensing with the necessity of the "hopper-jack," which has heretofore been used.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a diagrammatic view illustrating the adaptation of the apparatus. Fig. 2 is a sectional plan view of the cooler on the line 2 2 in Fig. 3, and Fig. 3 is a vertical section thereof.

Referring to Fig. 1, 10 indicates the brewing-room, in which is arranged the kettle for cooking the malt and hops. 11 indicates the cooling-room, and 12 the fermenting-room. According to Fig. 1 these rooms are shown one above the other, so that the product may be passed by gravity; but of course the rooms may be arranged otherwise, if desired.

The cooling apparatus comprises an exterior wall or casing 14, which may, if desired, be mounted on the floor of the cooling-room by means of legs 15 or other supports, keeping the bottom of the tank raised above the floor. Within these exterior walls forming the tank 14 is a tank 16, sustained on the bottom of the tank 14 by supports 17 of any desired form. The tank 14 contains the ammonia-pipes 18 and is also adapted to contain the brine ordinarily used in cooling apparatus, and the tank 16 is adapted to receive the wort. Both tanks 14 and 16 are provided with manholes 19 and 20 near their tops or covers, as shown in Fig. 2, these manholes permitting access to be had to the interiors of the tanks, as will be hereinafter described. The ammonia-pipes 18 run into and out of the tank 14 and coil around the tank 16, so as to thoroughly cool the same.

Within the tank 16 is arranged an agitator-blade 21, which is carried on a shaft 22. This shaft has at one end a crank 23 or other means for facilitating the revolution of the shaft. This work may be done either manually or by machine-power. In the practical operation of the cooler it is not necessary to revolve the shaft continuously, but only at intervals, so as to keep the wort at a uniform temperature throughout the tank 16. The end of the shaft 22, which carries the crank 23, is passed through and mounted in a sleeve 24, which is hermetically connected with the walls of the tanks 14 and 16 by means of glands 25, which may be screwed or otherwise fastened in the ends of the sleeve. This not only prevents the wort in the tank 16 from leaking out, but also prevents the brine from entering the wort-tank. At its other end the shaft 22 is mounted in a bearing 26. This bearing may be the same as the bearing 24, or, if desired, it may be simply a box fastened to the inner side of the tank 16 and carrying the shaft without necessitating passing the shaft through the wall of the tank.

Just above the bottom of the tank 16 is a screen 27, which is formed of a number of sections, the size and shape of which may be varied at will. These sections are removable by lifting them upward, so as to clear out the hops and facilitate cleaning the sections.

28 indicates a pipe or conduit which passes from the copper or kettle downward through the tops of the tanks 14 and 16, so as to discharge the wort, hops, and other insoluble residue of the brewing operation into the tank 16. The wort after passing through the strainer 27 is drawn off into the fermenting-room 12 by means of a pipe 29 or other means, and from the lowermost portion of the tank 16 a large conduit or pipe 30 passes. This pipe empties in the cooling-room and is adapted to furnish the means through which the hops and other solid matter are discharged.

In using the invention, after the mash has been brewed the whole contents of the brewing-kettle are run into the tank 16, in which tank the wort is thoroughly cooled. The agitator 21 is operated from time to time to keep the beer at a uniform temperature throughout the tank, and after the cooling has been effected the pipe 29 is opened, and the wort after passing through the strainer 27 is run off into the fermenting-room. This having been done, a workman enters the tank 16 either through the manholes 19 and 20 or through any other orifices which may be provided for this purpose. By raising one or more sections of the screen 27 the hops may be shoveled into the very bottom of the tank 16 and through the conduit 30, after which they may be removed by any suitable means, which do not, of course, enter into my invention. This having been done, the interior of the tank 16, including the screen 27 and agitator 21, may be thoroughly cleaned and the parts replaced, whereupon the apparatus will be ready for a second operation.

31 indicates a pipe for drawing off the brine from the tank 14.

Valves or gates are provided for the various pipes and conduits, as will be obvious and as is illustrated in the drawings.

33 indicates a tube adapted to receive a thermometer to determine the temperature of the wort.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A wort-cooler, comprising a brine-tank, a wort-tank within the brine-tank, an agitator within the wort-tank, and a drive-shaft for the agitator, the drive-shaft extending through the walls of the wort and brine tanks, and a sleeve extending across between said walls and hermetically connected therewith, through which sleeve said shaft extends.

2. A wort-cooler, comprising a brine-tank, a wort-tank within the brine-tank, a circulating-pipe within the brine-tank outside of the wort-tank, a sieve in the lower portion of the wort-tank, inlet and outlet devices for the wort-tank, an agitator within the wort-tank, a drive-shaft for the agitator, the drive-shaft extending through the walls of the wort and brine tanks, and a sleeve extending across between said walls and hermetically fastened thereto, through which sleeve said shaft extends.

3. A wort-cooler, comprising a brine-tank, a wort-tank within the brine-tank, a circulating-pipe within the brine-tank outside of the wort-tank, a sieve in the lower portion of the wort-tank, inlet and outlet devices for the wort-tank, an agitator within the wort-tank, a drive-shaft for the agitator, the drive-shaft extending through the walls of the wort and brine tanks, and a sleeve extending across between said walls and hermetically fastened thereto, through which sleeve said shaft extends, the said sieve comprising sections separately removable, for the purpose specified.

4. A wort-cooler, comprising a cooling-tank, a wort-tank within the cooling-tank, a relatively small wort-outlet means, a relatively large hop-outlet means, both of said outlet means passing from the bottom of the wort-tank, and a sectional sieve placed in the lower portion of the wort-tank and normally covering both of said outlet means.

In testimony whereof I have signed my name to this specification in the presence of two subscribing witnesses.

ALBERT ZEIGER.

Witnesses:
GEORGE DERINGER,
ADAM CHRISTMANN, Jr.